US007301493B1

(12) United States Patent
Canales et al.

(10) Patent No.: US 7,301,493 B1
(45) Date of Patent: Nov. 27, 2007

(54) META-MATERIALS BASED UPON SURFACE COUPLING PHENOMENA TO ACHIEVE ONE-WAY MIRROR FOR VARIOUS ELECTRO-MAGNETIC SIGNALS

(75) Inventors: Peter R. Canales, Bayonne, NJ (US); Hong-Liang Cui, Basking Ridge, NJ (US); Alexander Raspopin, Jersey City, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 234 days.

(21) Appl. No.: 11/288,061

(22) Filed: Nov. 21, 2005

(51) Int. Cl.
*G01S 13/00* (2006.01)

(52) U.S. Cl. ........................ 342/5; 342/1; 342/3; 342/4; 342/13; 342/175

(58) Field of Classification Search .............. 342/1-13, 342/175; 343/872
See application file for complete search history.

(56) References Cited

U.S. PATENT DOCUMENTS 6,985,118 B2 * 1/2006 Zarro et al. ................. 343/756
7,068,234 B2 * 6/2006 Sievenpiper ................ 343/745
7,071,888 B2 * 7/2006 Sievenpiper ................ 343/745
7,164,387 B2 * 1/2007 Sievenpiper ................ 343/702
7,170,085 B2 * 1/2007 Raspopin et al. ............. 257/21
7,205,941 B2 * 4/2007 Wang et al. ......... 343/700 MS
2005/0093023 A1 * 5/2005 Rasponin et al. ........... 257/202
2005/0107125 A1 * 5/2005 Gilbert .................... 455/562.1
2006/0035605 A1 * 2/2006 Ozluturk et al. ............ 455/101
2006/0092079 A1 * 5/2006 de Rochemont ..... 343/700 MS
2006/0125681 A1 * 6/2006 Smith et al. ................ 342/120
2006/0192465 A1 * 8/2006 Kornbluh et al. ........... 310/800

OTHER PUBLICATIONS

"Positive/negative refractive index anisotropic 2-D metamaterials", Caloz, C.; Itoh, T.Microwave and Wireless Components Letters, IEEE vol. 13, Issue 12, Dec. 2003 pp. 547-549.*
"Photonic band gap structure containing metamaterial with negative permittivity and permeability",Physical Review E (Statistical Non-linear and Soft Matter Physics), Sep. 2002, vol. 66, No. 3, p. 36611-1-4, 15, Nefedov-I-S, Tretyakov-S-A.*

* cited by examiner

*Primary Examiner*—John B Sotomayor
(74) *Attorney, Agent, or Firm*—Michael Zelenka; George B. Tereschuk

(57) ABSTRACT

A one-way reflective sensor shield with an increased bandwidth meta-materials coating is provided which substantially reduces or eliminates deleterious electronic signatures and backscattering. The one-way reflective sensor shield with meta-materials coating operates according to surface plasmonic coupling phenomena and achieves a mirror-like one-way reflection of electromagnetic signals. In this arrangement, the meta-materials coating is composed of a dielectric material, and the corrugated metal strips are composed of a metallic conductive material with a negative dielectric constant, to allow surface plasmonic coupling between the plasma in the metal and the incident electromagnetic field. Surface plasmons occur at the interface of a material with a positive dielectric constant, such as dielectric surface, with that of a negative dielectric constant, usually a metal or doped dielectric, such as the metal strips. Sensor devices and sensor shielding systems are also provided.

19 Claims, 2 Drawing Sheets

META-MATERIALS BASED UPON SURFACE COUPLING PHENOMENA TO ACHIEVE ONE-WAY MIRROR FOR VARIOUS ELECTRO-MAGNETIC SIGNALS

GOVERNMENT INTEREST

The invention described herein may be manufactured, used, imported and licensed by or for the Government of the United States of America without the payment to us of any royalty thereon.

FIELD OF THE INVENTION

This invention relates generally to the field of plasmonics and subwavelength transmission. In particular, the present invention relates to surface plasmonic coupling in meta-material sensor shields.

BACKGROUND OF THE INVENTION

Current military tactical networks and communications systems are greatly constrained by the bandwidth limitations of the RF spectrum. The ever-expanding information age has led to many simultaneous voice, video and data applications which require more and more bandwidth. This is particularly true in tactical military communications with numerous life-or-death requirements to stream voice, video and data information to military personnel in dangerous locations. Thus, there is an ever-increasing critical need for greater bandwidth.

Along with the critical need for increased bandwidth, current military, law enforcement and security tactics have placed more and more reliance on the use of sensors for situational awareness. Remote sensors in numerous applications now provide intelligence information about unwanted human intruders, ground vibrations, vehicular traffic, battlefield monitoring, battle planning, environmental conditions, seismic events, the weather, and so on. Remote sensor equipment generally needs to be positioned in such a way that the user is not detected by the opponent. When prior art sensors are placed in an array with a group of other sensors, such arrangements can typically create detectable electronic signatures and backscattering, which is radio propagation in which the direction of the incident and scattered waves, resolved along a reference direction, are oppositely directed. Sensors that emit unwanted electronic signatures and backscattering limit their effectiveness and endanger the lives of military, law enforcement and security personnel. Current techniques to limit or retard unwanted electronic signatures and backscattering largely involve a design and development process specific to each system. The overall goal is to reduce the radar cross section through techniques that include echo scattering and echo cancellation, but those skilled in the art will readily appreciate that there is currently no single solution for every system requiring concealment. Currently available techniques for eliminating electronic signature and backscattering counteract the user's ability to monitor the situation without being detected. Therefore, sensors that emit unwanted electronic signatures and backscattering suffer from a number of disadvantages, limitations and shortcomings that can seriously limit their capabilities and effectiveness.

Thus, there has been a long-felt need for a sensor to effectively detect, monitor and measure intelligence information without suffering from the prior art's disadvantages, limitations and shortcomings of a detectable electronic signature, backscattering and numerous design-specific solutions. Needless to say, a discretely positioned and shielded sensor could avoid or minimize detection and greatly enhance undetected intelligence gathering. Up until now, there is no available shielded sensor that effectively limits or prevents detection of an electronic signature and backscattering in a way that allows the user to successfully gather intelligence without detection. New meta-materials utilizing surface plasmonic coupling and similar surface phenomena can now make it possible to answer the long-felt needs for a shielded sensor and increased bandwidth, without suffering from the disadvantages, limitations and shortcomings of prior art sensors.

SUMMARY OF THE INVENTION

In order to answer the long-felt need for a shielded sensor that can effectively detect, monitor and measure intelligence information without a detectable electronic signature and backscattering, the present inventors have developed an increased bandwidth one-way reflective sensor shield composed of a meta-materials coating that facilitates surface plasmon coupling and similar surface phenomena. This invention's increased bandwidth one-way reflective sensor shield now makes it possible to substantially reduce or eliminate deleterious electronic signatures and backscattering, without suffering from the disadvantages, limitations and shortcomings of prior art sensors.

One promising surface model for answering the critical need for increased bandwidth sensor and communications systems is surface plasmas, which are highly localized energy excitations on the surface of materials that can react strongly with incident electromagnetic radiation. Surface plasmons occur at the interface of a material with a positive dielectric constant with that of a negative dielectric constant. Surface plasmons play a role in surface-enhanced Raman scattering and in explaining anomalies in diffraction and metal gratings. Surface plasmons are sufficiently small in volume for probing nanostructures. The use of surface plasmons in sensor technology shows great promise for the development of future sensors and communication systems and may help achieve lightweight, low power, high bandwidth systems that can be used to gather real time data useful for the tactical environment with low cost designs.

The plasmon coupling phenomenon is defined as a wave vector matching between electromagnetic radiation incident on the surface of a material to the surface plasmon's dispersion relation. In general, incident light does not couple readily to plasmons on the surface of a material. There are several conditions and material characteristics that must be met in order to achieve any substantial coupling. A metal-dielectric interface, for example, requires some surface effect to shift the plasmon dispersion curve to intersect with the photon dispersion curve so that momentum is conserved. These surface effects can be achieved through gratings and lenses that effectively enhance the incident wave vector to match that of the surface plasmons.

The present inventors have explored the plasmonic coupling phenomena associated with enhanced transmission through subwavelength apertures and its potential for tactical applications, including manipulating surface plasmons on metal/dielectric interfaces using meta-materials. In electromagnetism, a meta-material is defined as an object that gains electromagnetic properties from its structure instead of inheriting them directly from the characteristics of its own material. In order for a structure to affect electromagnetic waves, a meta-material must have features with a size comparable to the wavelength of the electromagnetic radiation with which it interacts. By corrugating metal/dielectric interfaces of meta-materials with an array of metallic strips as depicted in the FIG. 1 conceptual illustration, the present inventors have found that incident waves can be enhanced and modulated. FIG. 1 depicts an incident transverse magnetic (TM) wave, and illustrates a grating set between two regions. For a generalized theoretical formalism these regions are denoted by their respective dielectric constants, $\in_1$ and $\in_2$, that may be real or complex. The grating itself is composed of a periodic array of two materials, $\in_m$ and $\in_h$, which represent a metal (e.g. Ag) and a dielectric (e.g. air) respectively. Tunability with such a grating is achieved by placing the grating on a compressible substrate. For example, $\in_2$ may be any magnetostrictive or electrostrictive material that can be dynamically stretched or shrunk by a voltage or modulating signal. This substrate may therefore vary the hole-spacing and ultimately the transmission and reflection coefficients of the grating. In such a periodic array, it is possible to achieve effective transmission through sub-wavelength apertures by coupling to the plasmon and resonant modes.

From this basic geometry it is possible to develop effective filters that control both the transmission and reflectance of such a device. By enhancing the geometry to break the transverse symmetry of the grating it may also be possible to influence the directionality of the incident field. In other words, the present invention advantageously uses a grating geometry that allows ~100% transmission of light propagating through the meta-material in one direction while effecting ~100% reflection of light propagating in the other direction, hence a one-way mirror that resolves the long-standing need for a shielded sensor without suffering from disadvantages, limitations and shortcomings of a detectable electronic signature, backscattering and design-specific solutions found in prior art sensors.

It is an object of the present invention to provide a meta-material coating that uses surface plasmonic coupling phenomena to shield sensors requiring a low probability of detection.

It is another object of the present invention to provide an increased bandwidth one-way reflective meta-materials coating based upon the surface plasmonic coupling phenomena to shield sensors and substantially reduce or eliminate deleterious electronic signatures and backscattering.

It is still a further object of the present invention to provide an increased bandwidth meta-materials coating based upon the surface plasmonic coupling phenomena that achieves a mirror-like one-way reflective sensor shield for electromagnetic signals and substantially reduces or eliminates deleterious electronic signatures and backscattering, without suffering from the disadvantages, limitations and shortcomings of prior art sensors.

These and other objects and advantages can now be attained by this invention's one-way reflective sensor shield device comprising a metal/dielectric interface corrugated with an array of apertures and gaps that enhances incident waves using a meta-materials coating as the interface substrate to maximize the surface plasmonic coupling phenomena and provide increased bandwidth. In accordance with the present invention, the tunable increased bandwidth one-way reflective sensor shield device achieves an advantageous one-way mirror effect for electromagnetic signals that substantially reduces or eliminates deleterious electronic signatures and backscattering. This invention encompasses several sensor shields, sensor devices and sensor shielding systems for shielding a sensor with meta-materials and the surface plasmonic coupling phenomena to substantially reduce or eliminate deleterious electronic signatures and backscattering.

DETAILED DESCRIPTION OF THE DRAWINGS

The one-way reflective sensor shield of the present invention comprises an array of corrugated ridges and grooves deposited on a metal/dielectric interface with a meta-materials coating that amplifies incident waves and focuses scattered divergent waves into a concentrated beam. The meta-materials coating on the interface substrate maximizes surface plasmonic coupling phenomena and provides increased bandwidth and tunable filters based upon surface plasmon coupling and resonant tunneling. The surface plasmon coupling effect through a grating geometry allows the device to remain frequency independent. Theoretically, the one-way reflective sensor shield will be able to operate for any electromagnetic frequency with grating periodicity on the order of half the incident wavelength. The device is therefore capable of operating in environments of both high and low bandwidth applications. The underlying principle of this invention is to break the symmetry of current traditional gratings in order to achieve a one-way mirror effect. By achieving the desired one-way mirror effect, the transmission coefficient of incident electromagnetic fields can be controlled to allow propagation in one direction and only reflection in the other. The mirror effect will be tunable through the use of a compressible substrate that allows for dynamic tuning.

Figure 1:
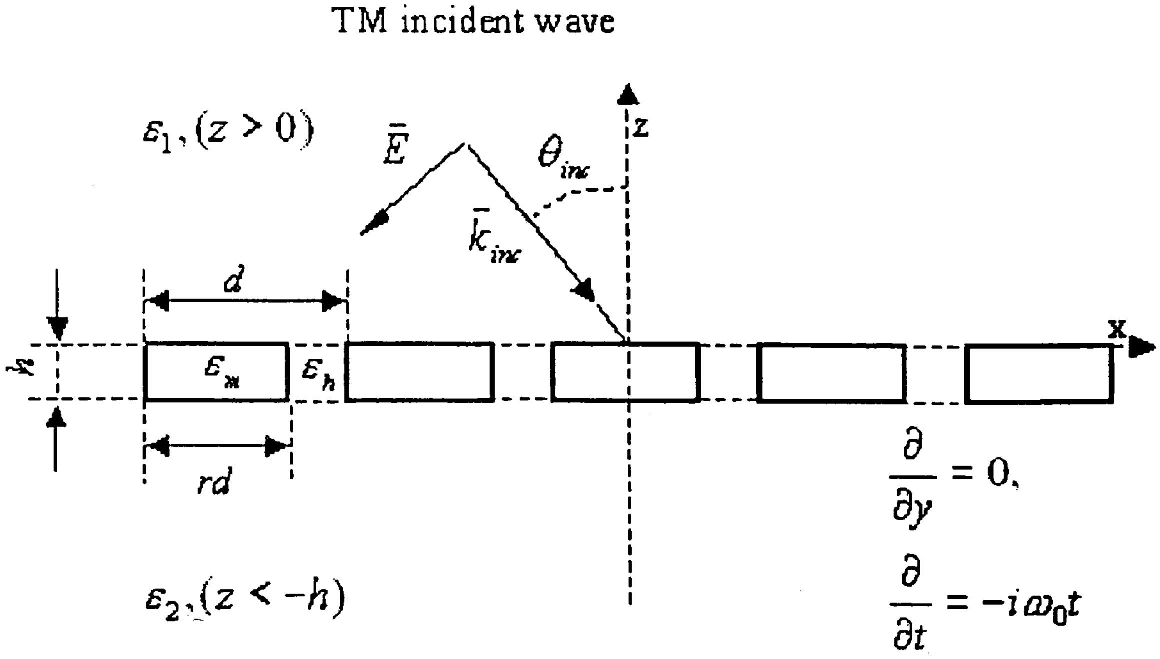
FIG. 1 is a conceptual illustration of corrugating metal/dielectric interfaces of meta-materials with an array of metallic strips.
Figure 2:
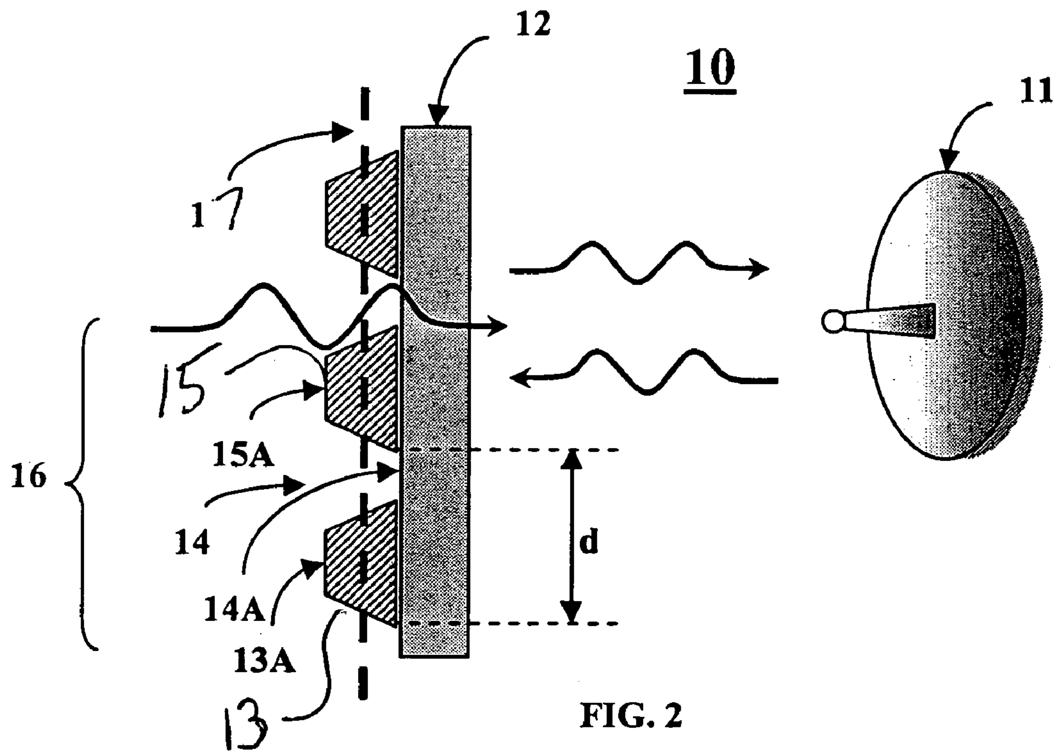
FIG. 2 is a cross-sectional conceptual illustration of one embodiment of the one-way reflective sensor shield of the present invention.

Referring now to the drawings, FIG. 2 is a cross-sectional conceptual illustration of the first embodiment of the one-way reflective sensor shield of the present invention. The one-way reflective sensor shield 10 comprises a sensor surface 11 with a meta-materials coating 12 having an array of corrugated metal strips 13 and 15 separated by gap 14. Multiple corrugated metal strips 13 and 15 deposited on the sensor surface 11 further comprise a periodic grating array 16. Enhancement regions 13A, 14A and 15A are locations on the meta-material coated sensor surface where surface plasmonic coupling occurs in accordance with the present invention. In this arrangement, the meta-materials coating 12 is composed of a dielectric material, and the corrugated metal strips 13 and 15 are composed of a metallic conductive material with a negative dielectric constant, to allow surface plasmonic coupling between the plasma in the metal and the incident electromagnetic field. Surface plasmons occur at the interface of a material with a positive dielectric constant, such as dielectric surface 11, with that of a negative dielectric constant, usually a metal or doped dielectric, such as the metal strips 13 and 15. Surface plasmons represent electromagnetic surface waves that have their intensity maximum in the surface and the exponentially decaying fields that are perpendicular to the surface. Dashed line 17 represents the line of symmetry which is broken by the configuration of the grating deposited on the sensor surface. Breaking the line of symmetry 17 is a crucial element of this invention because it controls the directionality of the grating. Incident electromagnetic radiation will impinge upon a boundary that is dependent upon its direction and is therefore effected by the incident geometry. For example, radiation traveling from left to right through the grating will "see" a larger grating hole size than radiation that travels from right to left. Dimension d is the distance between the centers of metallic strips 13 and 15, and denotes the periodicity of the grating array 16. In this embodiment, the metal strips 13 and 15 are configured with a trapezoidal profile, however, numerous other grating shapes, configurations and geometries are also possible and are considered to be within the contemplation of the present invention.

The sensor surface 11 with its meta-materials coating 12 makes the one-way reflective sensor shield 10 extremely useful for concealment of detection systems by preventing backscatter of probing fields from radar. The one-way reflective sensor shield 10 will be frequency dependent but can be designed to be effective in any frequency range. The mirror concept is illustrated by the wavy arrows on both sides of the meta-material coating 12, and will also be useful as a high quality laser cavity to increase the lasing effect. The ability to control reflection and transmission through a material has infinite possibilities for electromagnetic applications. Dynamically controlling this effect through tunable surfaces also enhances these capabilities.

The cooperation of the meta-material coating 12, enhancement regions 14A-15A and the periodic grating array 16 enhances surface plasmon fields and resonant tunneling effects. The importance of the one-way mirror effect is to break the line of symmetry 17 of the periodic grating array 16. This invention enhances the periodic grating array 16 in the traditional sense in that the homogeneity of the grating plane is no longer symmetrical. Current concealment devices attempt to redirect light away from the probing source by scattering the field in various directions. By contrast, this invention's one-way reflective sensor shield 10 does not redirect light but rather prevents the field from propagating away from the concealed sensor. This invention's innovative approach is more closely related to the complex interrelationship between the periodic grating array 16 and the associated coupling of electromagnetic waves to the surface plasma in the enhancement regions 13A-15A because incident electromagnetic radiation is allowed to propagate to the shielded sensors surface. Prior art devices protect the sensor by scattering incident fields away from the sensor and in a direction opposite from its incident path. This invention's approach is to allow the incident field to reach the sensor surface and reflect. This reflection is then either absorbed by the grating or reflected again. The fact that the field reaches the sensor allows it to sense that it is being probed but still remain undetected.

In accordance with the present invention, a properly configured periodic array placed on a meta-material coated surface can achieve greater than 100% transmission through sub-wavelength holes by coupling to the plasmon modes. This phenomenon has long thought to be restricted by the theories of classical diffraction when dealing with sub-wavelength apertures. The transmission results when the plasmon dispersion curve is shifted, via the periodic grating array 16, to intersect with the photon dispersion curve. The minimum requirements for a properly configured periodic array are dependent upon proper material selection of the metal, dielectric and the grating geometry. The periodicity of the grating is on the order of half the incident field's wavelength. The dielectric constants of the metal and dielectric are also dependent on the incident wavelength. These relationships are well understood through common electromagnetic formulations including Maxwell's equations.

In operation, when the sensor surface 12 of the one-way reflective sensor shield 10 is coated with a periodic grating array 16, the shield will protect the desired detection or monitoring system from backscattered rays from its coated sensor surface 12. For example, by coating a radar detection system with a meta-material, the radar detection system would be able to sense incident fields but will not be exposed to other systems attempting to detect backscattered fields from its surface. Ultimately the incident field that propagates through the surface will need to be absorbed to dissipate its energy. As a laser cavity, the meta-material will provide the mirrored surface that reradiates the field within the laser cavity and increases the lasers quality factor. Typical materials that could be used for a meta-material coating in accordance with the present invention include common metals like Ag, Au and Cu and common dielectrics like quartz, air and glass.

Variations of the first embodiment of the one-way reflective sensor shield 10 of the present invention include a variety of geometries that alter the geometry of the grating based upon the directionality of the incident electromagnetic field.

Figure 3:
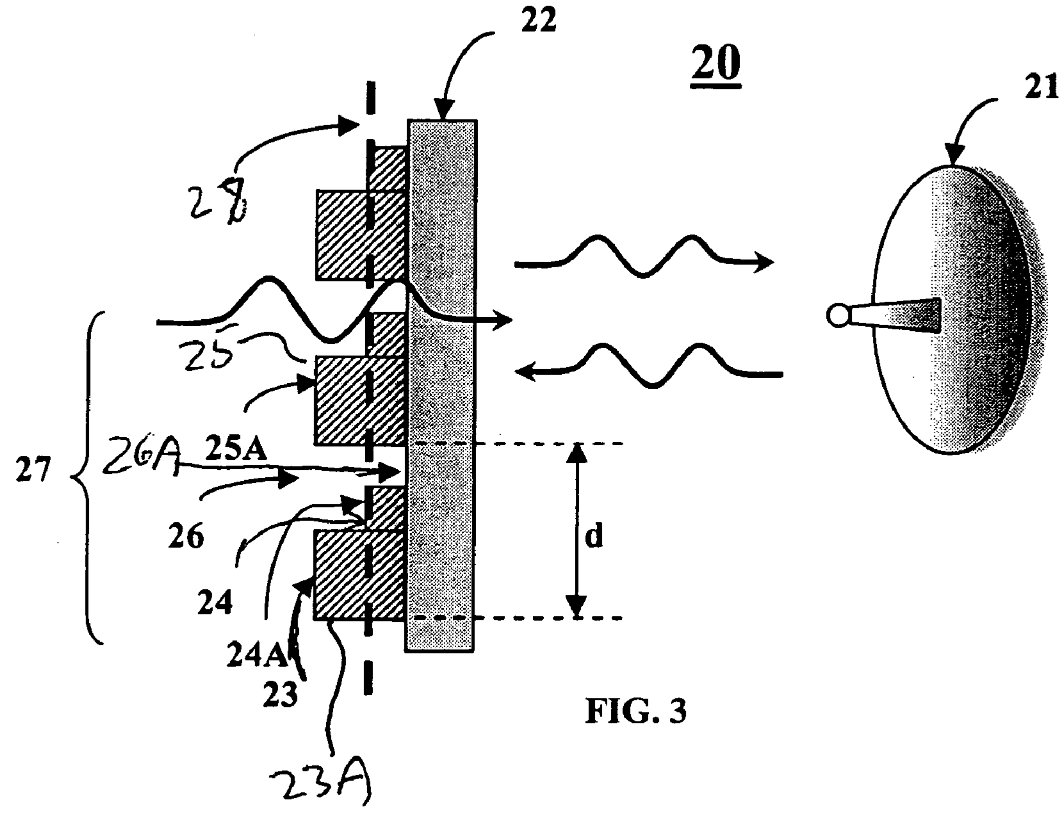
FIG. 3 is a cross-sectional conceptual illustration of another embodiment of the one-way reflective sensor shield of the present invention.

Referring now to the drawings, FIG. 3 is a cross-sectional conceptual illustration of the second embodiment of the one-way reflective sensor shield of the present invention. The one-way reflective sensor shield 20 comprises a sensor surface 21 with a meta-material coating 22 having an array of corrugated metal strips 23, 24 and 25, with thin strip 24 being thinner than strips 23 and 25. In this configuration, thin strip 24 and strip 25 are separated by a gap 26. In this arrangement, the meta-materials coating 22 of the sensor surface 21 is composed of a dielectric material, and the corrugated metal strips 23, 24 and 25 are composed of a metallic conductive material with a negative dielectric constant to allow surface plasmonic coupling of the meta-material coating 22. Multiple metallic strips 23, 24 and 25 further comprise a periodic grating array 27 deposited on the meta-material coating 22. Enhancement regions 23A, 24A, 25A and 26A are locations on the meta-material coated sensor surface 21 where surface plasmon coupling occurs in accordance with the present invention. Dashed line 28 represents the line of symmetry which is broken by the configuration of the grating array 27 deposited on the sensor surface 21. Breaking the line of symmetry 28 is a crucial element of this invention because it controls the directionality of the grating. Incident electromagnetic radiation will impinge upon a boundary that is dependent upon its direction and is therefore affected by the incident geometry. For example, radiation traveling from left to right through the grating will "see" a larger grating hole size than radiation that travels from right to left. Dimension d is the distance between the edge of strip 23 and 25, and this dimension is significant because it denotes the periodicity of the periodic grating array 27. In this embodiment, the metallic strips 23, 24 and 25 are configured with a square or rectangular profile, however, numerous other grating shapes, configurations and geometries are also possible and are considered to be within the contemplation of the present invention. Typical materials that could be used for a meta-material coating in accordance with the present invention include common metals like Ag, Au and Cu and common dielectrics like quartz, air and glass.

Variations of the second embodiment of the one-way reflective sensor shield 20 of the present invention include a variety of geometries that alter the geometry of the grating based upon the directionality of the incident electromagnetic field.

It is to be further understood that other features and modifications to the foregoing detailed description are within the contemplation of the present invention, which is not limited by this detailed description. Those skilled in the art will readily appreciate that any number of configurations of the present invention and numerous modifications and combinations of materials, components, configurations, arrangements and dimensions can achieve the results described herein, without departing from the spirit and scope of this invention. Accordingly, the present invention should not be limited by the foregoing description, but only by the appended claims.

We claim:

1. A one-way reflective sensor shield, comprising:

a meta-material coating is deposited on a surface of said sensor;

a periodic grating array is deposited on said surface;

said array further comprising a pair of conductive corrugated strips separated by a gap;

said meta-material coating being composed of a dielectric material;

said array providing an imaginary non-symmetrical plane parallel to said surface extending from a one of said corrugated strips to another of said corrugated strips;

said sensor having a multitude of said periodic grating arrays;

said meta-material coating having a plurality of enhancement regions that generate a surface plasmonic coupling whenever said sensor is exposed to a beam of electromagnetic radiation based upon said meta-material coating having a positive dielectric constant and said corrugated strips having a negative dielectric constant; and said surface plasmonic coupling enhances a plurality of incident electromagnetic fields and controls a transmission coefficient of said incident electromagnetic fields to prevent said incident electromagnetic fields from propagating away from sensor allowing said sensor to be concealed and remain undetected.

2. The one-way reflective sensor shield, as recited in claim 1, further comprising eliminating a backscatter of probing fields from radar.

3. The one-way reflective sensor shield, as recited in claim 2, wherein said surface plasmonic coupling provides a one-way mirror effect for said beam that allows a radio propagation in a first direction and only a reflection in the another direction.

4. The one-way reflective sensor shield, as recited in claim 3, further comprising said sensor being tunable.

5. The one-way reflective sensor shield, as recited in claim 4, further comprising:

said meta-material being composed of common metals such as Ag, Au and Cu; and common dielectrics such as quartz, air and glass.

6. The one-way reflective sensor shield, as recited in claim 5, further comprising said corrugated strips being spaced a distance d along said sensor surface.

7. The one-way reflective sensor shield, as recited in claim 6, further comprising said corrugated strips having a trapezoidal shape.

8. The one-way reflective sensor shield, as recited in claim 6, further comprising said corrugated strips having a rectangular shape.

9. A one-way reflective sensor shield device, comprising:

a meta-material coating is deposited on a surface of said sensor;

a periodic grating array is deposited on said surface;

said array further comprising a pair of conductive corrugated strips separated by a gap;

said meta-material coating being composed of a dielectric material;

said array providing an imaginary non-symmetrical plane parallel to said surface extending from a one of said corrugated strips to another of said corrugated strips;

said sensor having a multitude of said periodic grating arrays;

said meta-material coating having a plurality of enhancement regions that generate a surface plasmonic coupling whenever said sensor is exposed to a beam of electromagnetic radiation based upon said meta-material coating having a positive dielectric constant and said corrugated strips having a negative dielectric constant;

said corrugated strips having a trapezoidal shape; and said surface plasmonic coupling enhances a plurality of incident electromagnetic fields and controls a transmission coefficient of said incident electromagnetic fields to prevent said incident electromagnetic fields from propagating away from sensor allowing said sensor to be concealed and remain undetected.

10. The one-way reflective sensor shield device, as recited in claim 9, further comprising eliminating a backscatter of probing fields from radar.

11. The one-way reflective sensor shield device, as recited in claim 10, wherein said surface plasmonic coupling provides a one-way mirror effect for said beam that allows a radio propagation in a first direction and only a reflection in the another direction.

12. The one-way reflective sensor shield device, as recited in claim 11, further comprising said sensor being tunable.

13. The one-way reflective sensor shield device, as recited in claim 12, further comprising:

said meta-material being composed of common metals such as Ag, Au and Cu; and common dielectrics such as quartz, air and glass.

14. A one-way reflective sensor shield system, comprising:

a meta-material coating is deposited on a surface of said sensor;

a periodic grating array is deposited on said surface;

said array further comprising a pair of conductive corrugated strips separated by a gap;

said meta-material coating being composed of a dielectric material;

said array providing an imaginary non-symmetrical plane parallel to said surface extending from a one of said corrugated strips to another of said corrugated strips;

said sensor having a multitude of said periodic grating arrays;

said meta-material coating having a plurality of enhancement regions that generate a surface plasmonic coupling whenever said sensor is exposed to a beam of electromagnetic radiation based upon said meta-material coating having a positive dielectric constant and said corrugated strips having a negative dielectric constant;

said corrugated strips having a rectangular shape; and said surface plasmonic coupling enhances a plurality of incident electromagnetic fields and controls a transmission coefficient of said incident electromagnetic fields to prevent said incident electromagnetic fields from propagating away from sensor allowing said sensor to be concealed and remain undetected.

15. The one-way reflective sensor shield system, as recited in claim 14, further comprising eliminating a back-scatter of probing fields from radar.

16. The one-way reflective sensor shield system, as recited in claim 15, wherein said surface plasmonic coupling provides a one-way mirror effect for said beam that allows a radio propagation in a first direction and only a reflection in the another direction.

17. The one-way reflective sensor shield system, as recited in claim 16, further comprising said sensor being tunable.

18. The one-way reflective sensor shield, as recited in claim 17, further comprising:

said meta-material being composed of common metals such as Ag, Au and Cu; and common dielectrics such as quartz, air and glass.

19. The one-way reflective sensor shield, as recited in claim 18, further comprising said corrugated strips being spaced a distance d along said sensor surface.

* * * * *